US008693940B2

(12) United States Patent
Amano

(10) Patent No.: US 8,693,940 B2
(45) Date of Patent: Apr. 8, 2014

(54) CONTROL APPARATUS, CONTROL METHOD FOR CONTROL APPARATUS, AND STORAGE MEDIUM

(75) Inventor: Hiroyuki Amano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/434,602

(22) Filed: Mar. 29, 2012

(65) Prior Publication Data

US 2012/0188571 A1 Jul. 26, 2012

Related U.S. Application Data

(63) Continuation of application No. 12/510,453, filed on Jul. 28, 2009, now Pat. No. 8,170,431.

(30) Foreign Application Priority Data

Jul. 29, 2008 (JP) ................................ 2008-195242

(51) Int. Cl.
*G03G 15/00* (2006.01)
*G06K 15/00* (2006.01)

(52) U.S. Cl.
USPC ............... 399/405; 399/43; 399/45; 358/1.12

(58) Field of Classification Search
USPC .......................................................... 399/405
See application file for complete search history.

(56) References Cited

U.S. PATENT DOCUMENTS 7,651,088 B2 * 1/2010 Stenzel et al. ................ 271/184
8,099,038 B2 * 1/2012 Matoba ......................... 399/404

FOREIGN PATENT DOCUMENTS

JP 2008-009062 A 1/2008

* cited by examiner

*Primary Examiner* — David Gray
*Assistant Examiner* — Andrew Do
(74) *Attorney, Agent, or Firm* — Canon USA Inc. IP Division

(57) ABSTRACT

A control method for a control apparatus includes obtaining an amount of a recording material applied on a first area of a sheet and an amount of a recording material applied on a second area of the sheet on the basis of image data recorded on the sheet stacked on a stacking unit; and performing control, in a case where a plurality of sheets are stacked on the stacking unit, so that a difference between a total amount of the recording material applied on the first area of the sheets and a total amount of the recording material applied on the second area of the sheets does not exceed a predetermined value on the basis of the obtained amount of the recording material. With this method, a limit of the number of stacked sheets is relieved while stability of the stacked sheets is maintained.

8 Claims, 15 Drawing Sheets

| |
|---|
| BASIC I/O PROGRAM |
| OS |
| OUTPUT STACKING CONTROL PROGRAM |
| ASSOCIATED DATA |
| WORK AREA |

| COMBINATION OF AREAS ON FRONT AND REAR SIDES | |
|---|---|
| FRONT | REAR |
| 1 | 10 |
| 2 | 11 |
| 3 | 12 |
| 4 | 13 |
| 5 | 14 |
| 6 | 15 |
| 7 | 16 |
| 8 | 17 |
| 9 | 18 |

FIG. 22

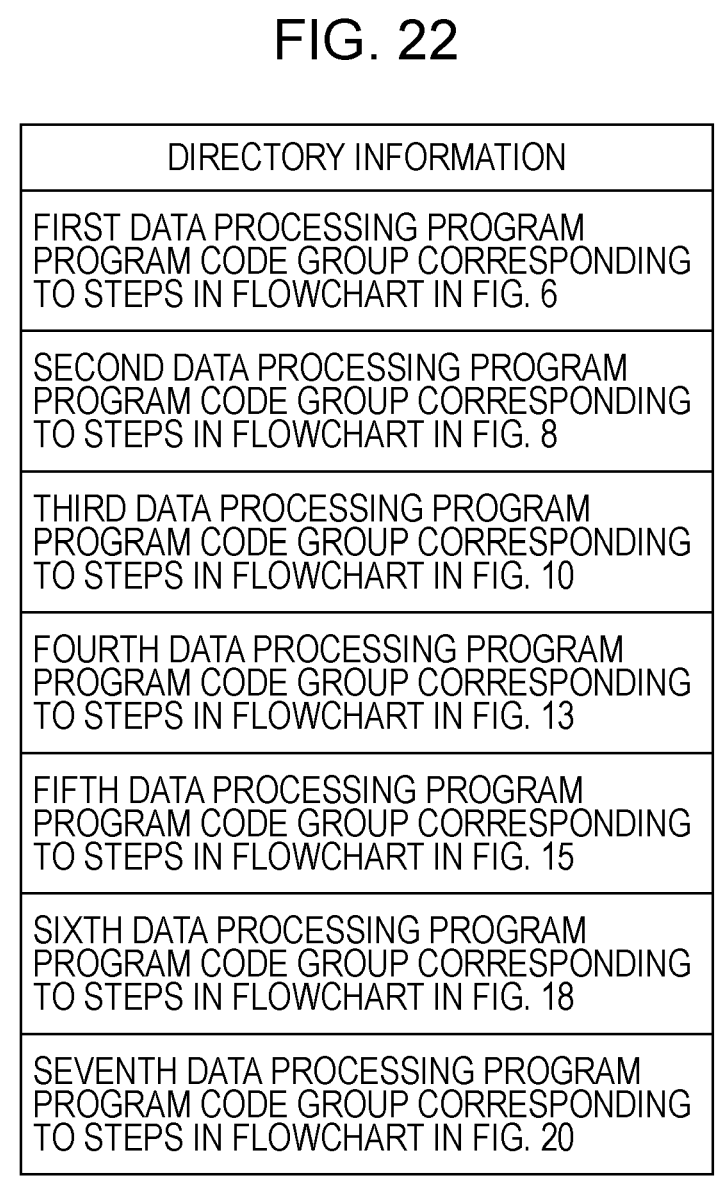

| DIRECTORY INFORMATION |
| --- |
| FIRST DATA PROCESSING PROGRAM<br>PROGRAM CODE GROUP CORRESPONDING TO STEPS IN FLOWCHART IN FIG. 6 |
| SECOND DATA PROCESSING PROGRAM<br>PROGRAM CODE GROUP CORRESPONDING TO STEPS IN FLOWCHART IN FIG. 8 |
| THIRD DATA PROCESSING PROGRAM<br>PROGRAM CODE GROUP CORRESPONDING TO STEPS IN FLOWCHART IN FIG. 10 |
| FOURTH DATA PROCESSING PROGRAM<br>PROGRAM CODE GROUP CORRESPONDING TO STEPS IN FLOWCHART IN FIG. 13 |
| FIFTH DATA PROCESSING PROGRAM<br>PROGRAM CODE GROUP CORRESPONDING TO STEPS IN FLOWCHART IN FIG. 15 |
| SIXTH DATA PROCESSING PROGRAM<br>PROGRAM CODE GROUP CORRESPONDING TO STEPS IN FLOWCHART IN FIG. 18 |
| SEVENTH DATA PROCESSING PROGRAM<br>PROGRAM CODE GROUP CORRESPONDING TO STEPS IN FLOWCHART IN FIG. 20 |

CONTROL APPARATUS, CONTROL METHOD FOR CONTROL APPARATUS, AND STORAGE MEDIUM

CROSS-REFERENCE TO RELATED APPLICATIONS

This application is a continuation of application Ser. No. 12/510,453 filed Jul. 28, 2009 that claims the benefit of Japanese Application No. 2008-195242 filed Jul. 29, 2008, both of which are hereby incorporated by reference in their entirety.

BACKGROUND OF THE INVENTION

1. Field of the Invention

The present invention relates to a control apparatus, a control method for a control apparatus, and a storage medium.

2. Description of the Related Art

Hitherto, there exists a sheet processing apparatus capable of stacking a large amount of sheets output from a printing apparatus, e.g., in a printing system for POD (Pint On Demand). A large amount of sheets can be stacked by using such a sheet processing apparatus, but a problem about stability of a bundle of stacked sheets arises.

For example, in a case where books bound by tape are stacked, the thickness of the tape causes inclination of a bundle of stacked sheets. If books are further stacked, the inclination becomes larger and the bundle of stacked sheets is more likely to unpile.

Under the present circumstances, a method of providing a sensor at a stacking unit is known as a method for preventing inclination of a bundle of stacked sheets beyond an allowable range and preventing unpiling of the bundle.

This is a method of measuring the height of a sheet bundle by the sensor provided at the stacking unit and stopping output of sheets when the height reaches a predetermined value (see Japanese Patent Laid-Open No. 10-139253).

In this method, however, output of sheets is stopped when the height of the sheet bundle reaches the predetermined value, and thus the number of sheets that can be output is smaller than the number of sheets that can be stacked on the staking unit. In other words, the number of sheets that can be stacked on the stacking unit is limited.

SUMMARY OF THE INVENTION

The present invention provides a control apparatus which overcomes the above-described problem.

According to an embodiment of the present invention, a control apparatus includes an obtaining unit configured to obtain an amount of a recording material applied on a first area of a sheet and an amount of a recording material applied on a second area of the sheet on the basis of image data recorded on the sheet stacked on a stacking unit; and a control unit configured to perform control, in a case where a plurality of sheets are stacked on the stacking unit, so that a difference between a total amount of the recording material applied on the first area of the sheets and a total amount of the recording material applied on the second area of the sheets does not exceed a predetermined value on the basis of the amount of the recording material obtained by the obtaining unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 22 illustrates a memory map of a storage medium to store various data processing program that can be read by an information processing apparatus or an image forming apparatus according to an embodiment of the present invention.

DESCRIPTION OF THE EMBODIMENTS

Hereinafter, embodiments of the present invention are described with reference to the attached drawings.

First Embodiment

Figure 3:
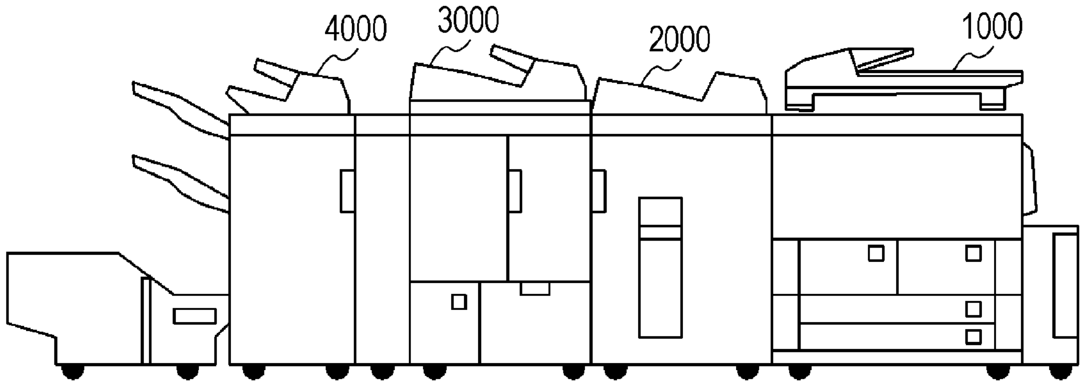
FIG. 3 is an appearance view illustrating a configuration of the printing system according to the first embodiment.

FIG. 3 illustrates an example of a configuration of a printing system to which the present invention can be applied. In this embodiment, the printing system includes a printing apparatus 1000, a large-capacity stacker 2000, a case binding machine 3000, and a saddle stitch binding machine 4000. The printing apparatus 1000 performs printing on sheets fed from a paper feeder unit and conveys the printed sheets to the large-capacity stacker 2000. The large-capacity stacker 2000 is an apparatus to stack sheets printed by the printing apparatus 1000. The case binding machine 3000 performs case binding on the sheets printed by the printing apparatus 1000. The saddle stitch binding machine 4000 performs saddle stitch binding on the sheets printed by the printing apparatus 1000. Each of the large-capacity stacker 2000, the case binding machine 3000, and the saddle stitch binding machine 4000 includes a sheet output unit to output printed sheets and outputs printed sheets on which various sheet processes have been performed to the sheet output unit. Accordingly, a user can obtain printed sheets output to the sheet output unit.

Figures 4, 5:
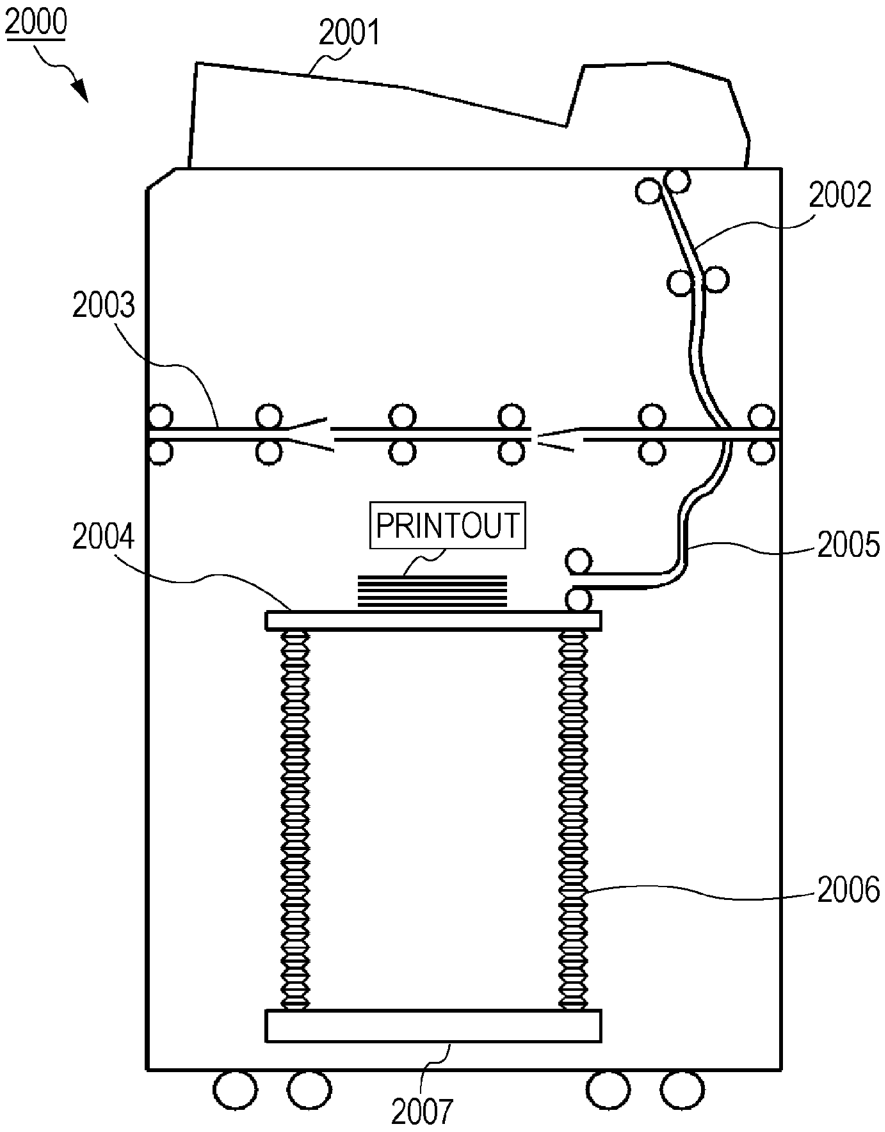
FIG. 4 illustrates a configuration of a large-capacity stacker according to the first embodiment.
FIG. 5 illustrates an example of a memory map of a RAM in the host apparatus illustrated in FIG. 2.

FIG. 4 is a cross-sectional view illustrating a configuration of the large-capacity stacker 2000. The large-capacity stacker 2000 conveys sheets printed by the printing apparatus 1000 illustrated in FIG. 3 to the case binding machine 3000 in the subsequent stage through a straight path 2003. Also, the large-capacity stacker 2000 outputs sheets printed by the printing apparatus 1000 to an escape tray 2001 through an escape path 2002 on the basis of specification by a user. Furthermore, the large-capacity stacker 2000 outputs, through a stack path 2005 onto a stack tray 2004, sheets that are output by executing a large-amount stacking job set by a user.

The stack tray 2004 of the large-capacity stacker 2000 is fixed to a carriage 2007 by elastic stays 2006. The user can convey a printout stacked on the stack tray 2004 by using the carriage 2007.

Figure 1:
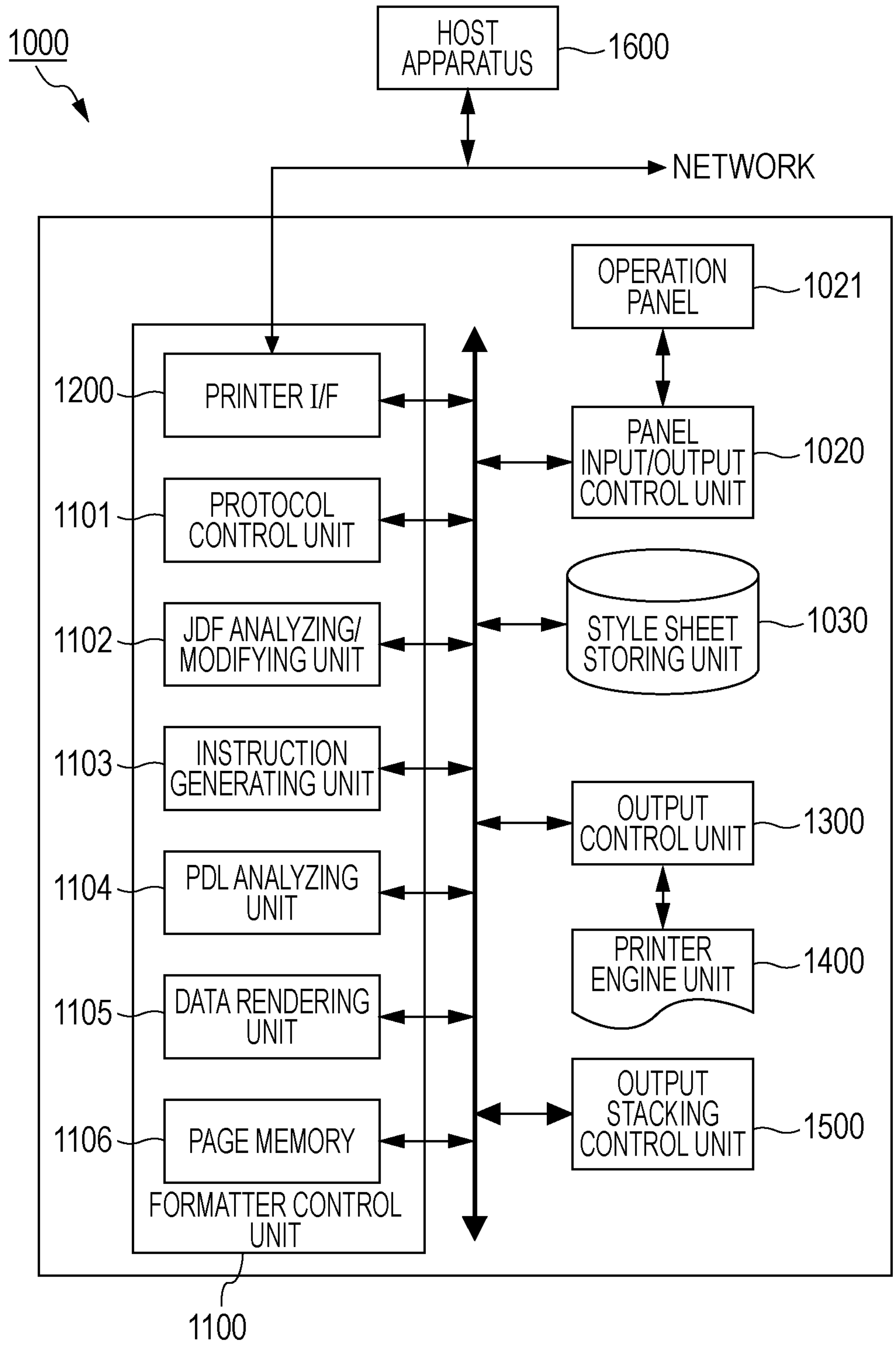
FIG. 1 is a block diagram illustrating a configuration of a printing apparatus in a printing system according to a first embodiment of the present invention.

FIG. 1 is a block diagram illustrating a configuration of the printing apparatus 1000. The printing apparatus 1000 communicates with a host apparatus 1600, which is an example of an information processing apparatus, via a network and receives a print job. The printing apparatus 1000 is not limited to a printing apparatus having a staple function and a folding function, but any printing apparatus having an ordinary printing function is applicable. For example, an MFP (Multi Function Peripheral) and an SFP (Single Function Printer) are included in the printing apparatus.

An operating system (OS) and a printer driver to control the printing apparatus 1000 are installed in the host apparatus 1600. The printer driver communicates with the printing apparatus 1000 and transfers print data thereto. Also, the printer driver obtains a status of the printing apparatus 1000 and displays it via a user interface.

In this embodiment, the printing apparatus 1000 roughly includes a formatter control unit 1100, a panel input/output control unit 1020, an operation panel 1021, a style sheet storing unit 1030, an output control unit 1300, a printer engine unit 1400, and an output stacking control unit 1500.

The formatter control unit 1100 includes a printer I/F (interface) 1200, a protocol control unit 1101, a JDF (Job Definition Format) analyzing/modifying unit 1102, an instruction generating unit 1103, a PDL (Page Description Language) analyzing unit 1104, a data rendering unit 1105, and a page memory 1106.

The printer I/F 1200 is an interface to input/output data from/to an external apparatus via the network. The protocol control unit 1101 controls a network protocol for communication via the network performed by the printing apparatus 1000.

The JDF analyzing/modifying unit 1102 analyzes received JDF data and recognizes processing steps. Also, the JDF analyzing/modifying unit 1102 determines the presence/absence of an offline step and adds a necessary modification to JDF itself.

The instruction generating unit 1103 generates PDL data for outputting instructions by combining the JDF and a style sheet. The PDL analyzing unit 1104 analyses PDL data and converts it to an intermediate code that can be processed more easily. The intermediate code generated by the PDL analyzing unit 1104 is supplied to the data rendering unit 1105 and is processed there.

The data rendering unit 1105 converts the intermediate code to bitmap data, which is sequentially rendered in the page memory 1106.

The panel input/output control unit 1020 controls input/output from/to the operation panel 1021. The style sheet storing unit 1030 functioning as a data temporary storing unit stores output data or storage data. The style sheet storing unit 1030 is realized by a secondary storage device, such as a hard disk. Generally, the formatter control unit 1100 is realized by a CPU (Central Processing Unit), a ROM (Read Only Memory), or a RAM (Random Access Memory).

The output control unit 1300 converts the content of the page memory 1106 to video signals and transfers an image to the printer engine unit 1400. The printer engine unit 1400 is a printing mechanism unit to print received video signals on a sheet as a visible image. In this embodiment, the printer engine unit 1400 forms a visible image by executing an electrophotography process to fix a toner image on a recording sheet. Also, the printer engine unit 1400 is capable of forming a monochrome image or a color image by using a monochrome toner or a color toner as a recording material.

The output stacking control unit 1500 decides a method for stacking sheets printed by the printer engine 1400 on the basis of an adhesion amount of toner on the sheets. The printing apparatus 1000 electrically connects to the large-capacity stacker 2000, the case binding machine 3000, and the saddle stitch binding machine 4000. The output stacking control unit 1500 of the printing apparatus 1000 decides a method for stacking sheets to be stacked on the large-capacity stacker 2000. Then, the output stacking control unit 1500 allows sheets to be stacked on the large-capacity stacker 2000 in accordance with the decided method.

Figure 2:
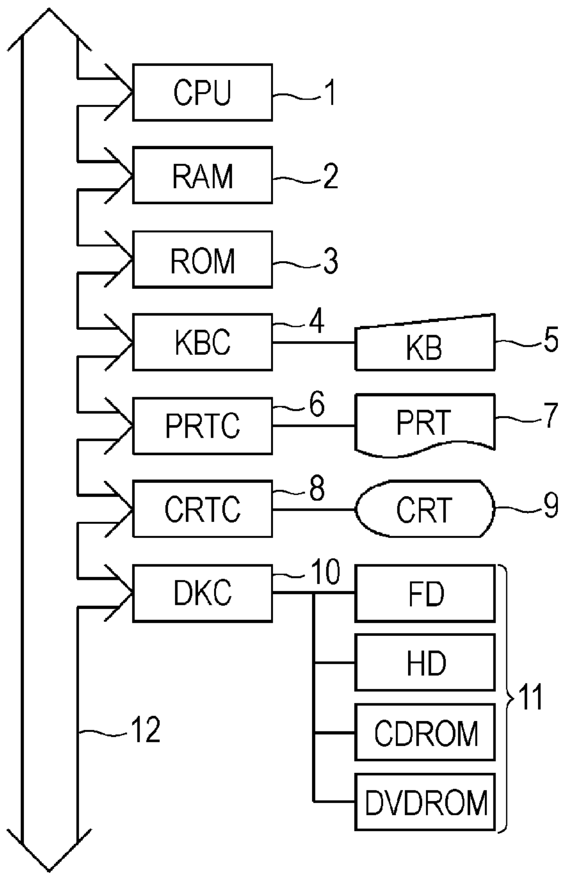
FIG. 2 is a block diagram illustrating a configuration of a host apparatus according to the first embodiment.

FIG. 2 is a block diagram illustrating a configuration of the host apparatus 1600 according to this embodiment.

Referring to FIG. 2, a CPU 1 controls the entire host apparatus 1600 and executes arithmetic processing. A RAM 2 is an area where respective programs and data are loaded in respective processes and are executed. A ROM 3 is an area to store a system control program, font data, and so on.

A keyboard control unit (KBC) 4 receives data through a key input from a keyboard (KB) 5 and transmits the data to the CPU 1. A printer control unit (PRTC) 6 controls a printer (PRT) 7. The printer 7 is a laser beam printer or an inkjet printer, for example.

A display control unit (CRTC) 8 controls display on a display device (CRT) 9. A disk control unit (DKC) 10 controls data transmission and so on.

An external storage device 11 includes a flexible disk device (FD), a hard disk device (HD), a CD (CD-ROM), or a DVD (DVD-ROM).

When the CPU 1 executes a program and data stored in the external storage device 11, the CPU 1 executes data processing by referring to the program and data or loading them to the RAM 2 as necessary. A system bus 12 functions as a data transfer path among the above-described devices.

The host apparatus 1600 operates when the CPU 1 executes a basic I/O (input/output) program, an OS (Operating System), and an electronic data compressing program described below.

The basic I/O program and the OS are stored in the ROM 3, and the OS is written in the external storage device 11. When the power of this apparatus is turned on, an IPL (Initial Program Loading) function in the basic I/O program causes the OS to be read from the HD as the external storage device 11 to the RAM 2, so that an operation of the OS starts.

In this embodiment, an output stacking control program and associated data are stored in the external storage device 11, and the program and data are read to the RAM 2 and are processed as necessary.

FIG. 5 illustrates an example of a memory map in the RAM 2 of the host apparatus 1600 illustrated in FIG. 2. This is an example of a memory map in a state where data such as the output stacking control program is loaded from the external storage device 11 to the RAM 2 and becomes executable.

Figure 6:
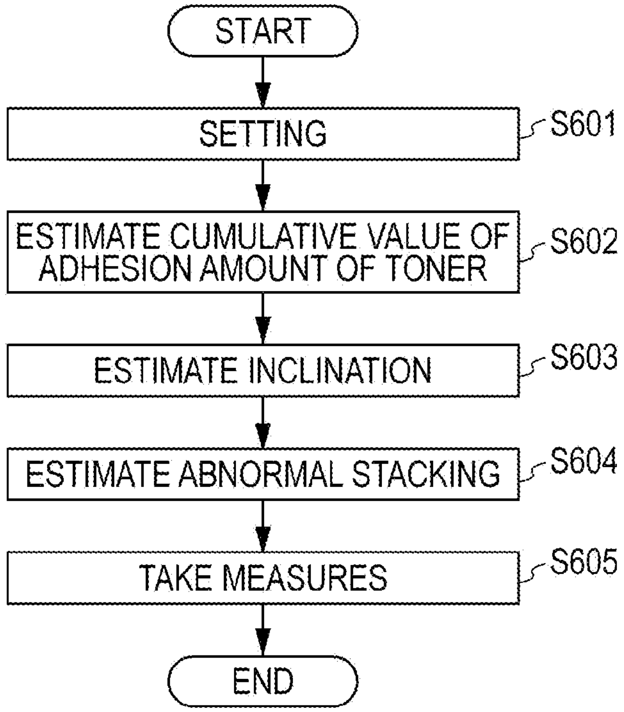
FIG. 6 is a flowchart illustrating an example of a first data processing procedure according to the first embodiment.

Now, a basic flow of this embodiment is described with reference to the flowchart in FIG. 6. FIG. 6 is a flowchart illustrating an example of a first data processing procedure in the host apparatus 1600 according to this embodiment. The respective steps in the flowchart in FIG. 6 are realized when the CPU 1 illustrated in FIG. 2 loads a program, such as the output stacking control program, to the RAM 2 and executes the program.

In step S601, the CPU 1 accepts print settings, such as the number of copies to be printed, a print sheet size, and specification of duplex printing, from a user via an operation unit such as the KB 5. Also, the CPU 1 accepts a setting about whether control to prevent unstableness of sheets to be stacked is performed from the user.

Specifically, the CPU 1 accepts a setting of split areas on sheets and a setting about measures to be taken when it is determined that the sheets incline. Then, the CPU 1 stores setting information accepted from the user in a memory such as the RAM 2.

Figure 7:
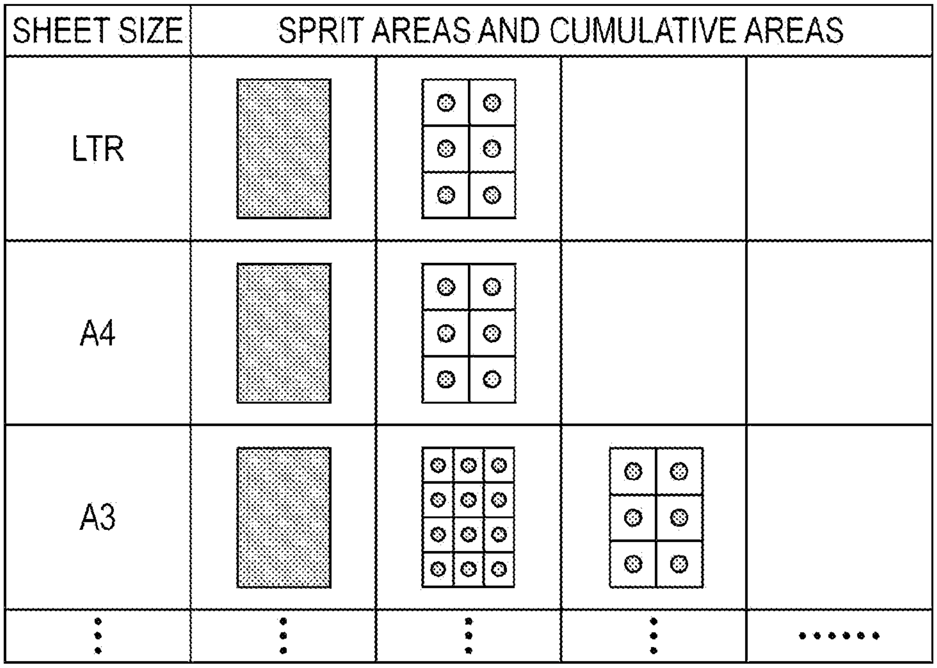
FIG. 7 illustrates split areas and cumulative areas according to the first embodiment.

Now, a setting of split areas is described with reference to FIG. 7. FIG. 7 illustrates split areas in the host apparatus 1600 according to this embodiment. The split areas are areas obtained by dividing a printing area on a sheet into a plurality of areas. In this embodiment, a plurality of split areas are prepared for each sheet size. The user selects split areas used to estimate inclination from among those split areas.

In FIG. 7, shaded areas inside the split areas are cumulative areas. The CPU 1 adds and accumulates the amount of toner applied on the cumulative areas in each sheet to be stacked and holds the cumulative amount. In a case where the CPU 1 determines that the amount of toner applied on the cumulative areas is unbalanced in a certain area, the CPU 1 takes measures to correct inclination of sheets due to the unevenness of the toner. The entire area of each split area may be set as a cumulative area. However, by limiting the area where toner is accumulated in each split area, as illustrated in FIG. 7, the load of a toner accumulating process by the CPU 1 can be reduced.

Figure 9:
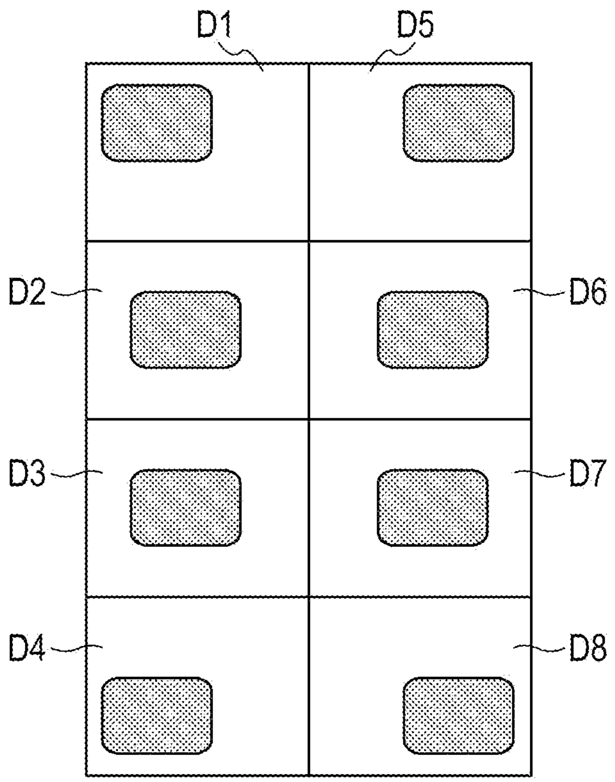
FIG. 9 illustrates an example of cumulative areas in the split areas illustrated in FIG. 7.

In the example illustrated in FIG. 7, the cumulative areas are provided at almost the center of the respective split areas. Alternatively, the user can arbitrarily specify and register a cumulative area in each split area, as illustrated in FIG. 9. In that case, the user specifies each cumulative area by using a pointing device, such as a mouse, included in the host apparatus 1600.

Then, the user is allowed to select cumulative areas to be used to determine inclination of sheets by the CPU 1 from among the cumulative areas created by the user as illustrated in FIG. 9 and the cumulative areas stored by sheet size as illustrated in FIG. 7.

For example, in a case where the position where a photo or a graphic image is to be printed is determined, it is desired that the user arbitrarily specifies cumulative areas as illustrated in FIG. 9. In that case, the user can specify an arbitrary position in the split areas on a sheet and allow the CPU 1 to perform control based on the amount of toner applied on that position.

In step S602, the CPU 1 calculates and estimates the sum of adhesion amounts of toner on all of a plurality of sheets to be output by executing a job in each of the split areas selected in step S601. Specifically, the CPU 1 performs an estimating process in units of jobs by accumulating the adhesion amount of toner in the respective cumulative areas determined by the split areas on the sheets to be output.

In step S603, the CPU 1 estimates inclination of a bundle of sheets to be stacked on the basis of the cumulative value estimated in step S602. Specifically, the CPU 1 performs an estimating process of inclination of the sheets to be stacked on the basis of a difference in adhesion amount of toner in the respective split areas.

In step S604, the CPU 1 performs an estimating process by determining whether the bundle of sheets to be stacked inclines on the basis of the inclination estimated in step S603. Specifically, the CPU 1 performs an abnormal stacking estimating process by determining whether the estimated inclination exceeds a predetermined inclination reference value. This inclination reference value can be changeable by the user via the KB 5 or the like.

In step S605, the CPU 1 takes measures to correct the inclination of the sheets to be stacked in accordance with the settings made in step S601, and then the process ends.

Alternatively, no measures may be taken in step S605 in accordance with the settings made by the user in step S601. In that case, the CPU 1 allows sheets to be stacked until the difference between the amount of toner applied in an area among a plurality of split areas and the amount of toner applied in another area exceeds the reference value. The CPU 1 stops the output process when the difference exceeds the reference value.

Next, the details of the process of estimating a cumulative value of an adhesion amount of toner in step S602 are described with reference to FIG. 8.

Figure 8:
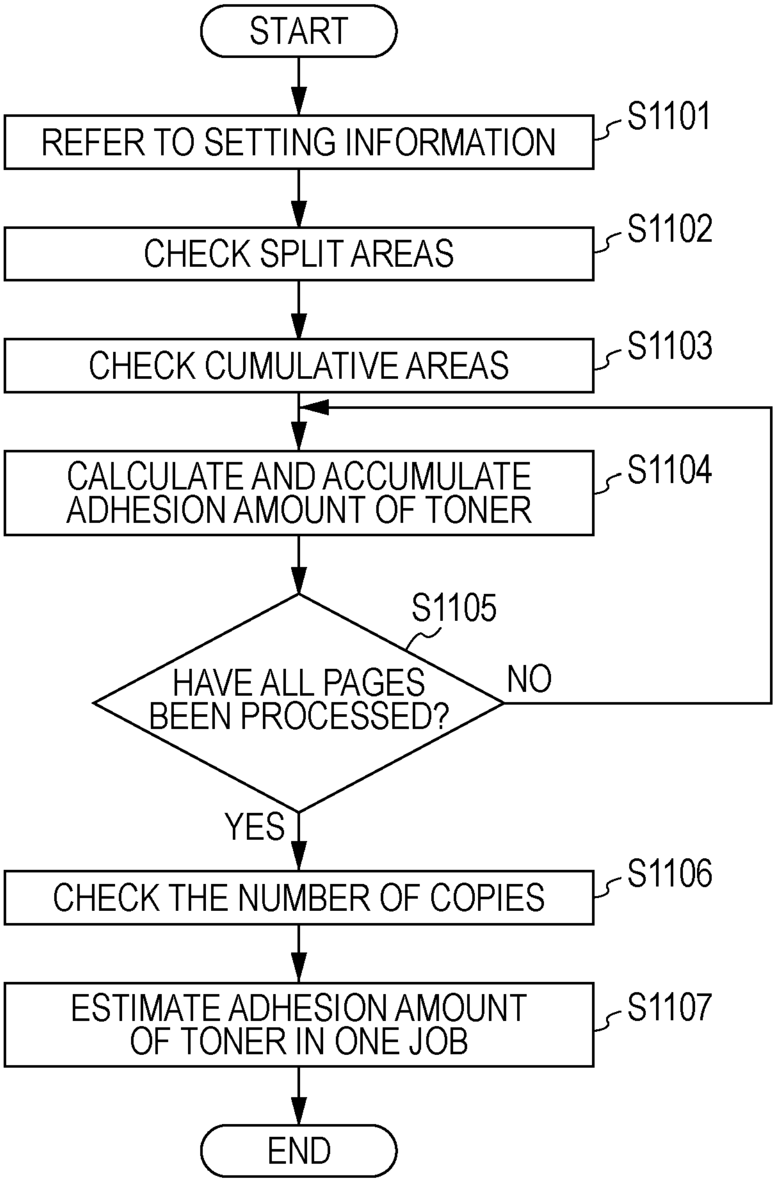
FIG. 8 is a flowchart illustrating an example of a second data processing procedure in the host apparatus according to the first embodiment.

FIG. 8 is a flowchart illustrating an example of a second data processing procedure in the host apparatus 1600 according to this embodiment. The respective steps in the flowchart in FIG. 8 are realized when the CPU 1 loads a stored program to the RAM 2 and executes the program.

In step S1101, the CPU 1 refers to the setting information set by the user in step S601 and stored in the RAM 2.

In step S1102, the CPU 1 checks the setting of the split areas included in the setting information.

In step S1103, the CPU 1 checks the cumulative areas preset in the respective split areas illustrated in FIG. 9.

In step S1104, the CPU 1 calculates an adhesion amount of toner in each pixel in the cumulative areas included in the split areas on the respective pages on the basis of a video count obtained from image data. Then, the CPU 1 adds the calculated adhesion amounts of toner in units of sheets, and stores the calculated value in units of cumulative areas in a memory such as the RAM 2. Alternatively, the CPU 1 may store the calculated value in the external storage device 11 instead of the RAM 2.

In a case where the image to be printed is a monochrome image, the CPU 1 calculates the adhesion amount of toner in units of pixels on the basis of a video count of K (black). On the other hand, in a case where the image to be printed is a color image, the CPU 1 calculates the adhesion amount of toner in unit of pixels on the basis of the sum of video counts of CMYK (cyan, magenta, yellow, and black).

In step S1105, the CPU 1 determines whether calculation of the adhesion amount of toner on all the pages to be printed has been completed. If the CPU 1 determines that calculation of the adhesion amount of toner on all the pages has not been completed, the process returns to step S1104, and the adhesion amount of toner is further calculated and accumulated.

On the other hand, if the CPU 1 determines in step S1105 that calculation of the adhesion amount of toner on all the pages has been completed, the process proceeds to step S1106.

In step S1106, the CPU 1 checks the number of copies specified in the print job. Specifically, the CPU 1 refers to the number of copies set in a print request made by the user via the operation unit such as the KB 5. In step S1107, the CPU 1 calculates the product of the cumulative value of the adhesion amount of toner obtained in step S1104 and the number of copies specified by the user, so as to calculate the adhesion amount of toner in one job.

With this process from step S1101 to step S1105, the adhesion amount of toner in the respective cumulative areas in one copy can be calculated. Furthermore, by multiplying the adhesion amount of toner by the specified number of copies in steps S1106 and S1107, the adhesion amount of toner in one job can be calculated.

Next, the process of estimating inclination in step S603 in FIG. 6 is described with reference to the flowchart in FIG. 10.

Figure 10:
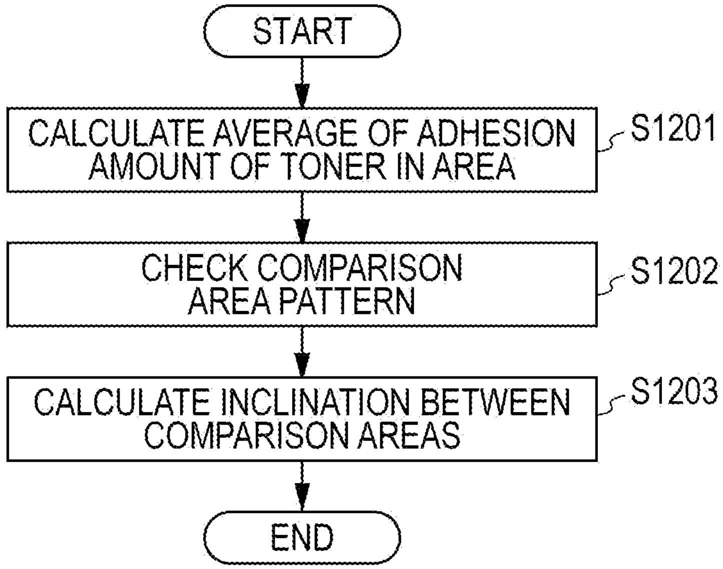
FIG. 10 is a flowchart illustrating an example of a third data processing procedure according to the first embodiment.

FIG. 10 is a flowchart illustrating an example of a third data processing procedure in the host apparatus 1600 according to this embodiment. The respective steps in the flowchart in FIG. 10 are realized when the CPU 1 loads a stored program to the RAM 2 and executes the program.

Figure 11:
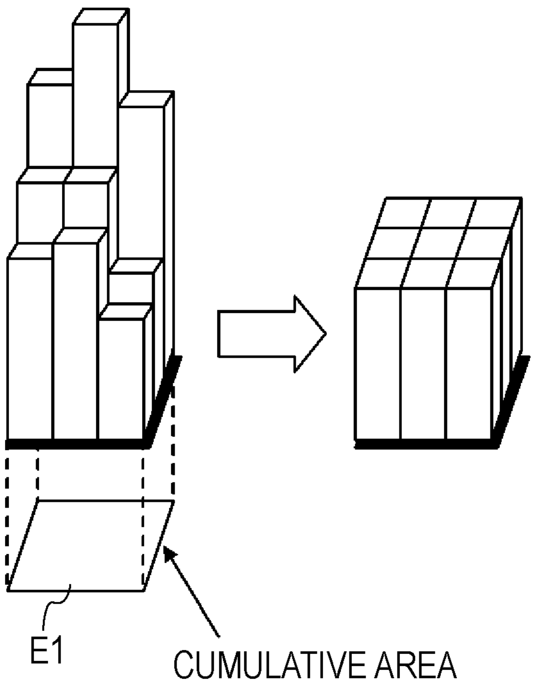
FIG. 11 illustrates a concept of calculating an average adhesion amount of toner in each pixel in each cumulative area.

First, in step S1201, the CPU 1 calculates an average of the adhesion amount of toner in the respective pixels in each cumulative area, as illustrated in FIG. 11.

FIG. 11 illustrates a concept of calculating an average of the adhesion amount of toner in the respective pixels in each cumulative area E1. The CPU 1 divides the adhesion amount of toner in the pixels included in the cumulative area by the number of pixels on the basis of a video count, so as to calculate an average amount of toner applied in the cumulative area. Then, the CPU 1 stores the calculated average in the RAM 2 while associating the average with the corresponding cumulative area. In this example, the number of pixels in each cumulative area is 9 for convenience of description, but of course the number of pixels in each cumulative area is not limited to 9.

Figure 12:
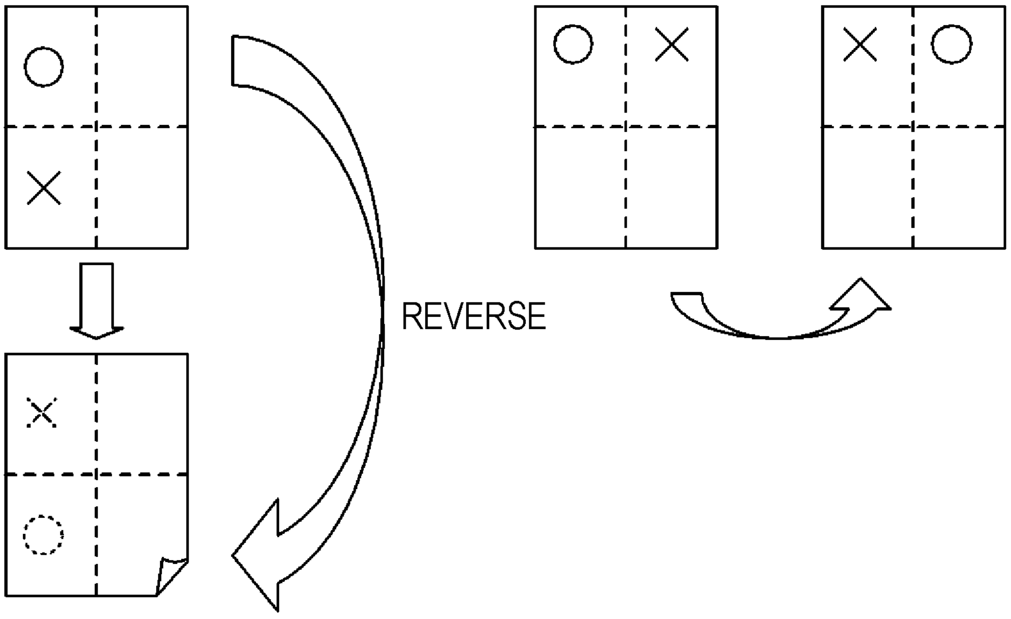
FIG. 12 illustrates an example of a comparison area pattern prepared for the split areas illustrated in FIG. 7.

In step S1202, the CPU 1 checks a comparison area pattern with respect to the selected split areas as illustrated in FIG. 12. The comparison area pattern includes two areas that are used as reference to estimate the inclination of sheets. An example of the comparison area pattern is illustrated in FIG. 12.

In FIG. 12, the area with a circle is an area where the cumulative amount of toner exceeds a predetermined value (first threshold). The area with a cross is an area where the cumulative amount of toner is smaller than a predetermined value (second threshold). In this case, in the sheets stacked, the area with a circle is high whereas the area with a cross is low. Thus, it can be estimated that the sheets incline toward the area with the cross.

In step S1203, the CPU 1 determines whether the sheets to be stacked incline as a result of being stacked, on the basis of the cumulative value of the adhesion amount of toner in each cumulative area. Specifically, the CPU 1 calculates the difference between the adhesion amount of toner applied in a first cumulative area and the adhesion amount of toner applied in a second cumulative area different from the first cumulative area in the plurality of cumulative areas on a sheet. If the difference is larger than a predetermined value, the CPU 1 determines that the sheets to be stacked incline as a result of being stacked, and performs control to prevent the inclination in the process performed thereafter.

Next, an example of the process of estimating abnormal stacking in step S604 in FIG. 6 is described with reference to the flowchart in FIG. 13.

Figure 13:
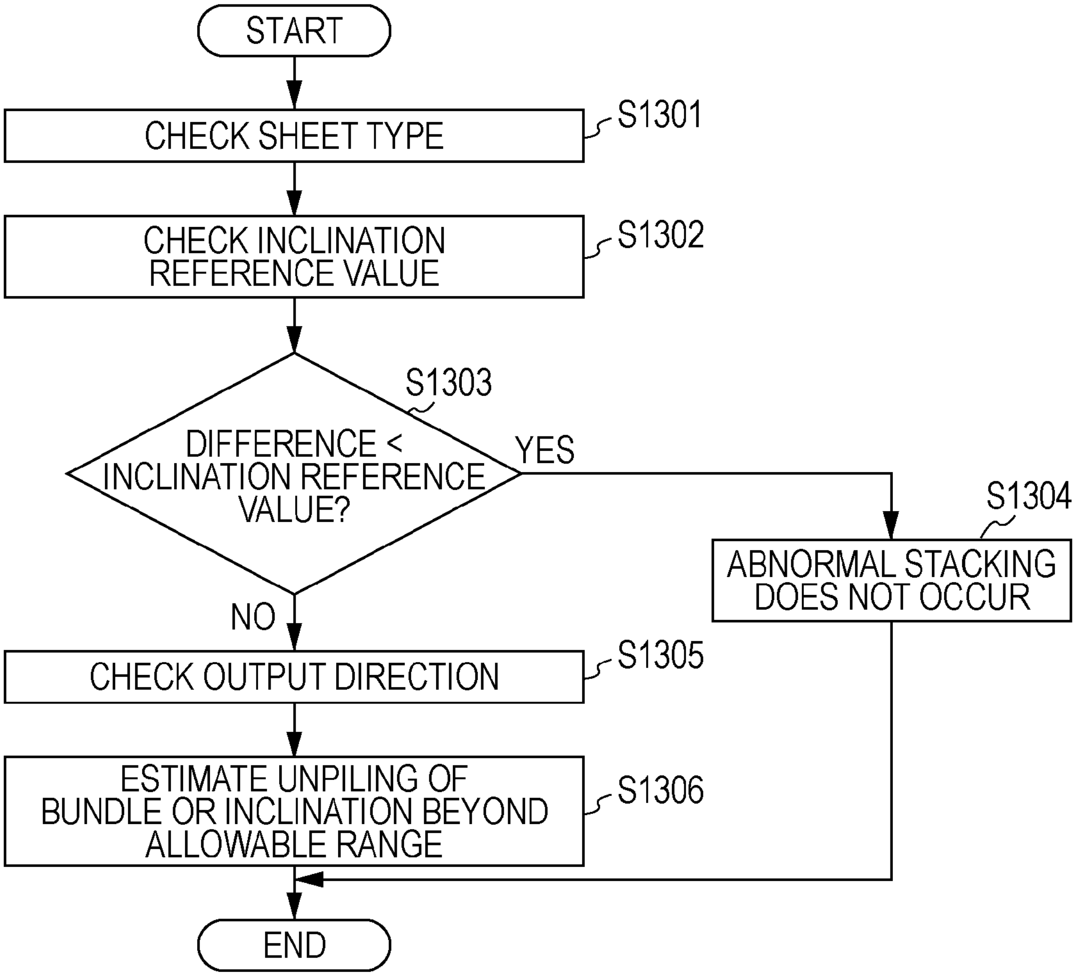
FIG. 13 is a flowchart illustrating an example of a fourth data processing procedure according to the first embodiment.

FIG. 13 is a flowchart illustrating an example of a fourth data processing procedure in the host apparatus 1600. The respective steps in the flowchart in FIG. 13 are realized when the CPU 1 loads the output stacking control program to the RAM 2 and executes the program.

In step S1301, the CPU 1 checks the type of sheets to be used in printing specified by the user. The type of sheets means the quality and thickness of sheets related to inclination or unpiling, and is set by the user with the use of a driver at the print setting.

In step S1302, the CPU 1 checks an inclination reference value, which is prepared for each type of sheets. The inclination reference values are set in view of that inclination varies in accordance with the type of sheets. For example, when an ordinary sheet is compared with a thick sheet, a basis weight is larger in the thick sheet, which is less likely to be affected by inclination due to toner. Thus, the inclination reference value of a thick sheet is larger than that of an ordinary sheet.

In step S1303, the CPU 1 compares the difference value calculated in the inclination estimating process in step S603 in FIG. 6 with the inclination reference value checked in step S1302 so as to determine whether the inclination reference value is smaller. That is, the CPU 1 determines whether the preset difference value calculated in the inclination estimating process exceeds the checked inclination reference value.

If the CPU 1 determines that the calculated difference value is smaller than (does not exceed) the inclination reference value, the process proceeds to step S1304, where the CPU 1 estimates that abnormal stacking does not occur during the job, performs an ordinary output process, and ends the process.

On the other hand, if the CPU 1 determines in step S1303 that the difference value is equal to or larger than the inclination reference value, the process proceeds to step S1305. In step S1305, the CPU 1 checks a sheet output direction. The sheet output direction is an output direction along the long side of a sheet or an output direction along the short side of a sheet. Then, in step S1306, the CPU 1 estimates the direction in which the sheets to be stacked incline in view of the sheet output direction (see FIG. 14), and the process ends. Here, the CPU 1 may notify the user of the estimated direction via the operation panel 1021 or the CRT 9 of the host apparatus 1600. The black arrows illustrated in FIG. 14 indicate the directions in which the bundle of sheets stacked on an output tray (OT) is likely to unpile.

Next, a flow of taking measures in step S605 in FIG. 6 is described with reference to the flowchart in FIG. 15.

Figure 15:
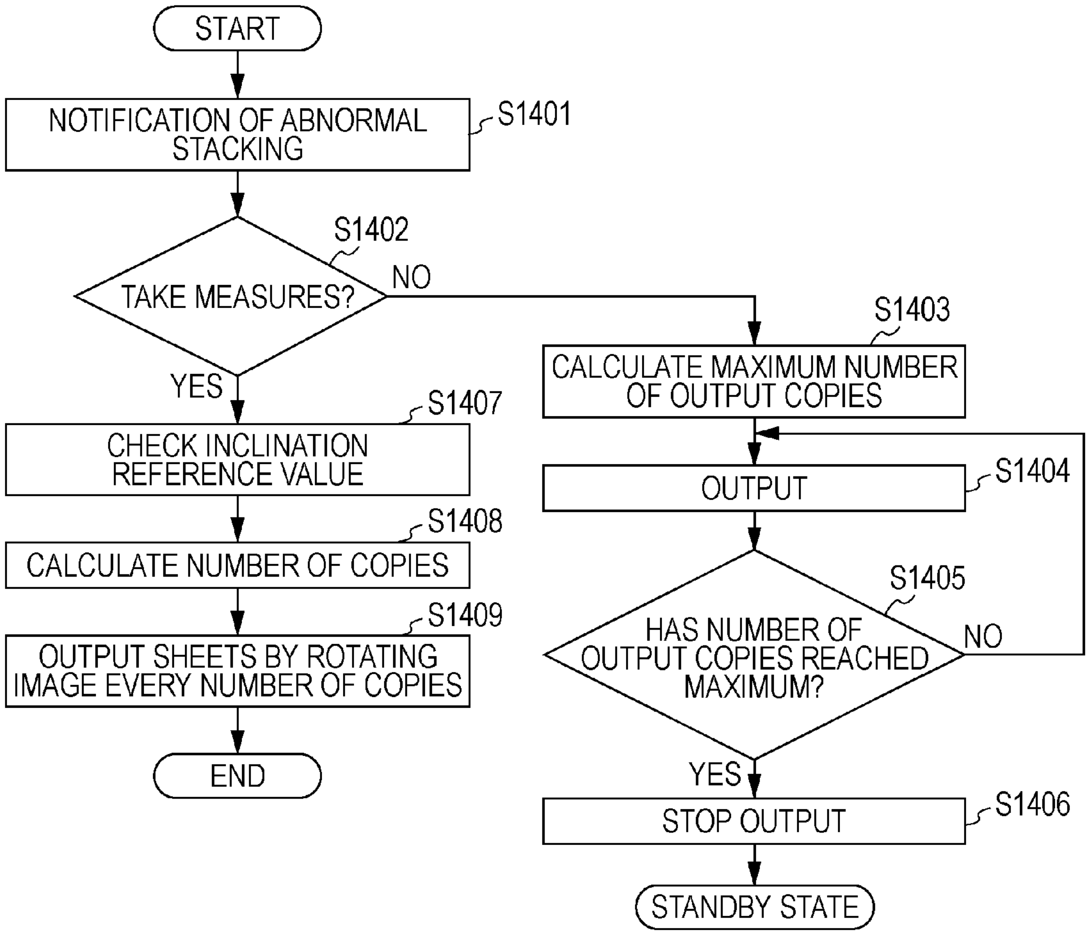
FIG. 15 is a flowchart illustrating an example of a fifth data processing procedure according to the first embodiment.

FIG. 15 is a flowchart illustrating an example of a fifth data processing procedure in the host apparatus 1600 according to this embodiment. The respective steps in the flowchart in FIG. 15 are realized when the CPU 1 loads the output stacking control program to the RAM 2 and executes the program.

If the occurrence of abnormal stacking is estimated in the abnormal stacking estimating step illustrated in FIG. 13, the CPU 1 allows the driver of the host apparatus 1600 to display the estimation on the CRT 9 in step S1401. At this time, the CPU 1 may perform control to display the estimation on the operation panel 1021.

In step S1402, the CPU 1 determines whether the setting is made in step S601 to take measures to compensate the inclination of sheets due to unevenness of toner at the output stacking estimation setting. If the CPU 1 determines that the setting to take measures is not set, the process proceeds to step S1403.

In step S1403, the CPU 1 calculates the maximum number of copies to be output allowing the inclination to be within an allowable inclination range. Specifically, the CPU 1 calculates the number of copies allowing the difference in adhesion amount of toner between first and second areas on a sheet to exceed the inclination reference value.

In step S1404, the CPU 1 controls the driver to output a document from the printing apparatus 1000 in an ordinary stacking manner. In step S1405, the CPU 1 determines whether the number of output copies has reached the number calculated in step S1403. If the CPU 1 determines that the number of output copies has not reached the calculated number, the process returns to step S1404, and the output continues.

On the other hand, if the CPU 1 determines in step S1405 that the number of output copies has reached the calculated number, the process proceeds to step S1406, where the CPU 1 stops the output from the printing apparatus 1000, and a standby state occurs. Here, control to stop the output in units of copies prevents stop of output during printing of one copy.

On the other hand, if the CPU 1 determines in step S1402 that setting is made to take measures to compensate inclination in step S601 in FIG. 6, the process proceeds to step S1407.

Figure 14:
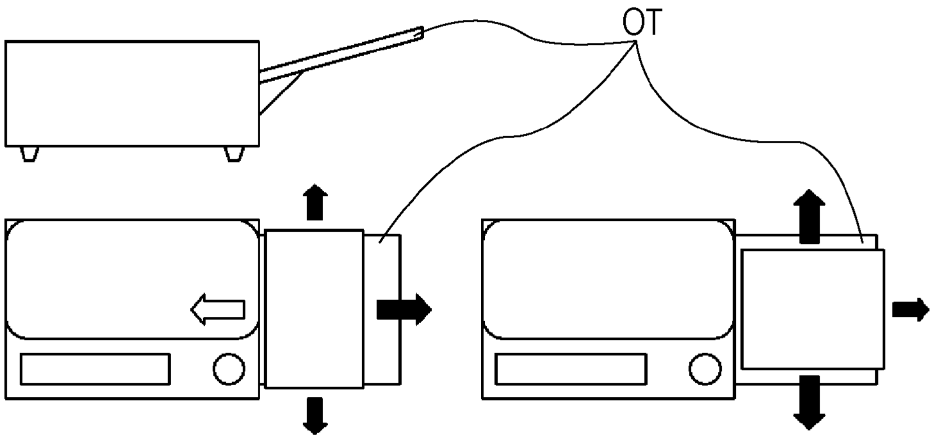
FIG. 14 illustrates a sheet output process in a sheet output tray according to the first embodiment.

In step S1407, the CPU 1 checks the inclination reference value, an example thereof being illustrated in FIG. 14, preset for each type of sheets. In step S1408, the CPU 1 calculates an appropriate shift number of copies by dividing the difference value in this job calculated in the above-described inclination estimating process illustrated in FIG. 8 by the inclination reference value.

In step S1409, the CPU 1 compensates the inclination of the bundle of stacked sheets, and the process ends. Specifically, the CPU 1 records image data on sheets to be stacked on a staking unit in the job by rotating the orientation of the image data by about 180 degrees every number of copies calculated in step S1408. Accordingly, the position of toner applied on sheets is changed, so that the CPU 1 can perform control to suppress inclination of the sheets. Alternatively, the CPU 1 may perform control in step S1409 to output sheets to be stacked on the stacking unit by reversing the front and rear sides of the sheets through a duplex path provided in the printing apparatus 1000. Alternatively, if the stacking unit (e.g., large-capacity stacker) of the printing apparatus 1000 has a mechanism to rotate the sheets horizontally to the sheet conveying direction without reversing the front and rear sides of the sheets, the CPU 1 may allow the mechanism to output the sheets by rotating the sheets by about 180 degrees.

Figure 16:
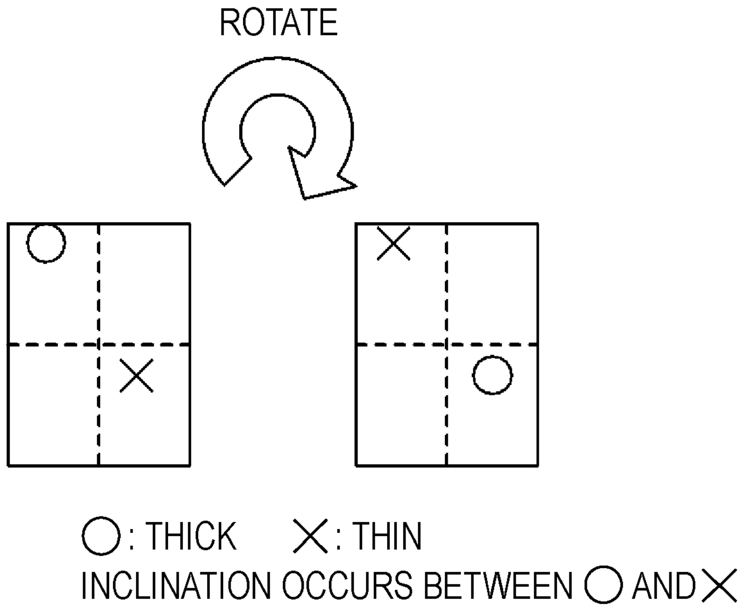
FIG. 16 is a schematic view illustrating a process of outputting sheets by rotating the sheets according to the first embodiment.

FIG. 16 is a schematic view illustrating a state of outputting sheets by compensating inclination due to toner in units of copies illustrated in FIG. 15.

In FIG. 16, a circle indicates an area where the adhesion amount of toner is large in a printing process, whereas a cross indicates an area where the adhesion amount of toner is small in a printing process.

Figure 17:
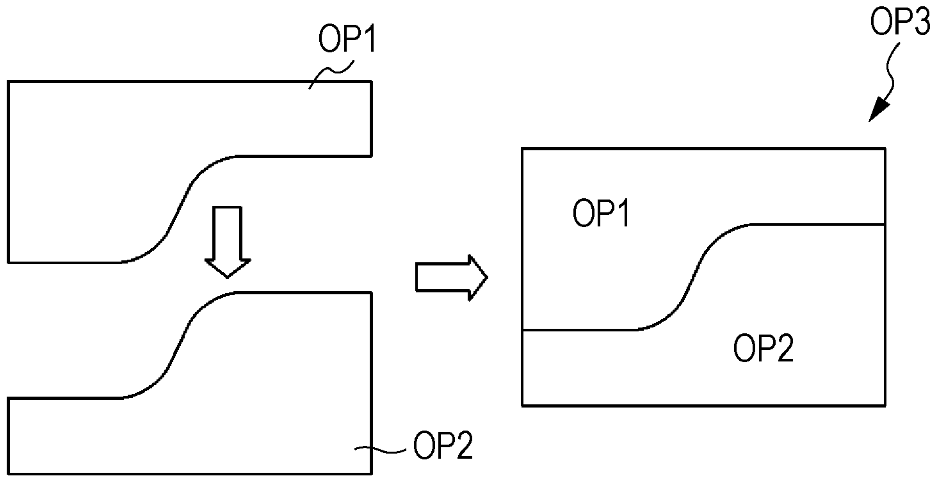
FIG. 17 is a schematic view illustrating a stacking example to compensate inclination of stacked sheets according to the first embodiment.

Accordingly, output sheet bundles OP1 and OP2 stacked on a sheet output unit of the printing apparatus 1000 are stacked as an output sheet bundle OP3 without inclination as illustrated in FIG. 17, with inclination due to toner being compensated.

According to this embodiment, inclination of stacked sheets due to unevenness of toner can be suppressed by setting made by a user. Accordingly, the number of sheets that can be stacked can be increased while maintaining the stability of the stacked sheets.

Second Embodiment

In the first embodiment, descriptions have been given about control to compensate inclination that occurs when the printing apparatus 1000 performs one-sided printing. Hereinafter, descriptions are given about a case of estimating an adhesion amount of toner in a duplex output in the printing apparatus 1000. Regarding the configuration of the printing apparatus 1000 and the process performed in the printing apparatus 1000, the part same as that in the first embodiment is not described here. In the first embodiment, the CPU 1 performs the process illustrated in the flowchart in FIG. 8 in step S602. In the second embodiment, the CPU 1 performs the process illustrated in the flowchart in FIG. 18 in step S602.

Figure 18:
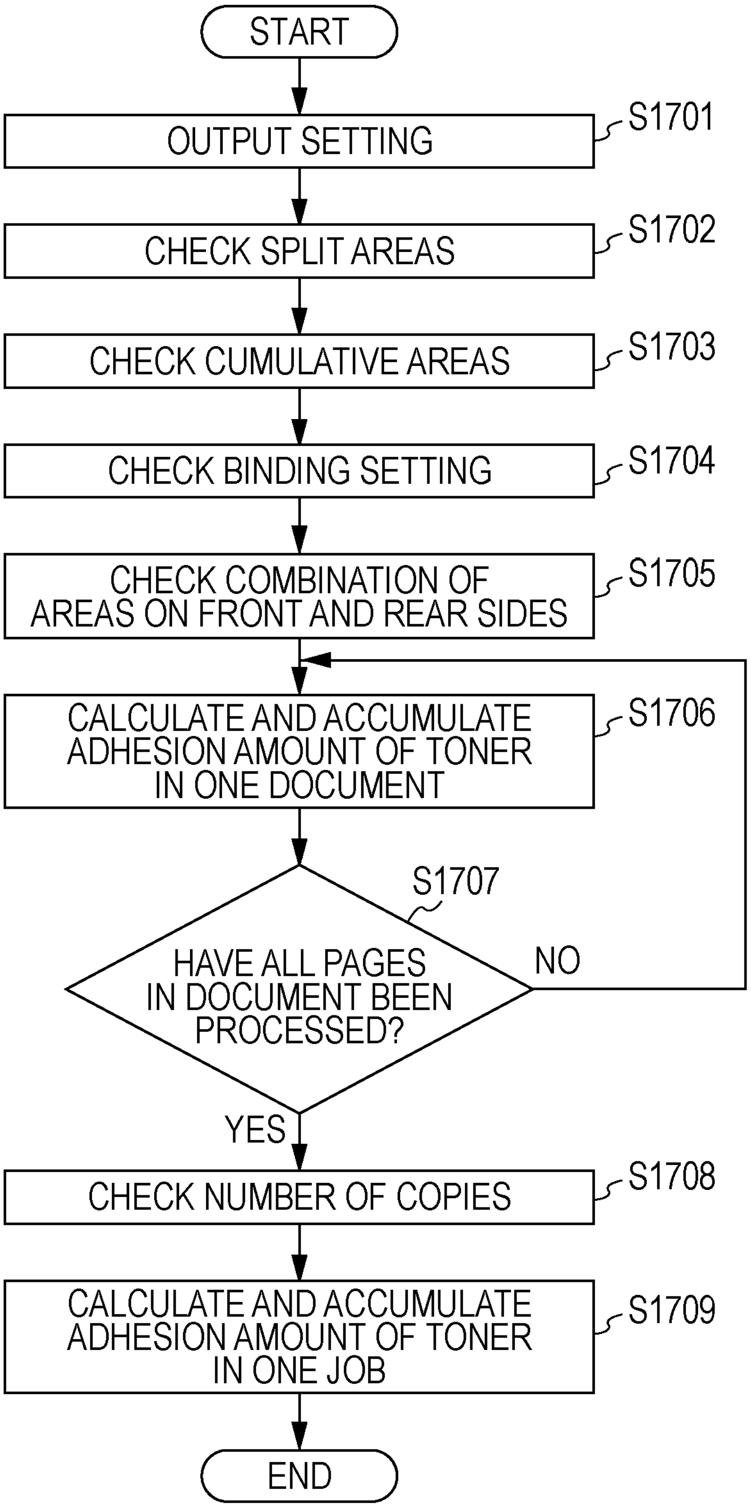
FIG. 18 is a flowchart illustrating an example of a sixth data processing procedure according to a second embodiment.

FIG. 18 is a flowchart illustrating an example of a sixth data processing procedure executed in the host apparatus 1600 in step S602. The respective steps in the flowchart in FIG. 18 are realized when the CPU 1 loads the output stacking control program from the RAM 2 and executes the program. In step S1701, the CPU 1 accepts settings to the printer driver controlling the printing apparatus 1000. The settings can be made via the operation panel 1021 provided in the printing apparatus 1000.

In step S1702, the CPU 1 checks the split areas selected in the setting made in step S1701. In step S1703, the CPU 1 checks the cumulative areas preset in the respective split areas illustrated in FIG. 9.

Figure 19:
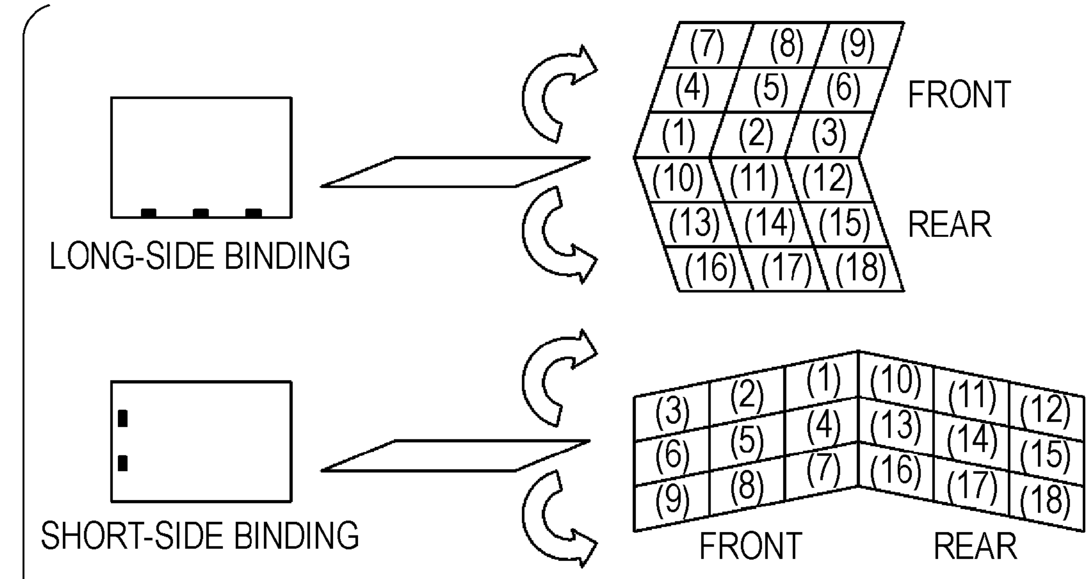
FIG. 19 illustrates an example of split areas in duplex printing according to the second embodiment.

In step S1704, the CPU 1 checks whether the setting of a duplex output is long-side binging or short-side binding illustrated in FIG. 19.

As shown in the table in FIG. 19, the respective areas on front and rear sides of sheets correspond to each other in the manner indicated by the numerals.

In step S1705, the CPU 1 checks the correlation between the split areas and the cumulative areas in odd pages and even pages as illustrated in FIG. 19.

In step S1706, the CPU 1 calculates the adhesion amount of toner in each pixel included in the cumulative area of each split area. Then, the CPU 1 accumulates and stores the adhesion amount in each pixel included in each cumulative area in an area prepared in the storage device in accordance with the correlation of split areas on the odd and even pages.

In step S1707, the CPU 1 determines whether calculation of the adhesion amount of toner on all the pages in the document to be output has been completed. If the CPU 1 determines that calculation of all the pages has not been completed, the process returns to step S1706, where the adhesion amount of toner is further calculated and accumulated.

On the other hand, if the CPU 1 determines in step S1707 that calculation of all the pages has been completed, the process proceeds to step S1708. In step S1708, the CPU 1 checks the number of copies specified in this job.

In step S1709, the CPU 1 calculates the adhesion amount of toner in each split area of one document accumulated until step S1707 for the number of copies. Then, the CPU 1 calculates the cumulative adhesion amount of toner in each split area in one job and ends the process. Thereafter, the CPU 1 performs the process illustrated in FIG. 6 from step S603. As described above, even when setting is made to perform duplex printing, the CPU 1 can calculate the amount of toner applied on both sides of sheets and perform control to suppress inclination of stacked sheets on the basis of the calculated amount of toner.

Third Embodiment

In the first embodiment, descriptions have been given about a process of suppressing inclination of stacked sheets by changing the orientation of image data recorded on output sheets when the sheets are output in a case where it is determined that a sheet bundle inclines. Hereinafter, descriptions are given about a case of suppressing inclination of stacked sheets by applying a clear toner in a specific area of the sheets in order to compensate unevenness of toner. Here, the clear toner is a transparent toner. In this embodiment, the printer engine unit 1400 of the printing apparatus 1000 includes a clear toner applying unit to apply a clear toner on sheets.

Figure 20:
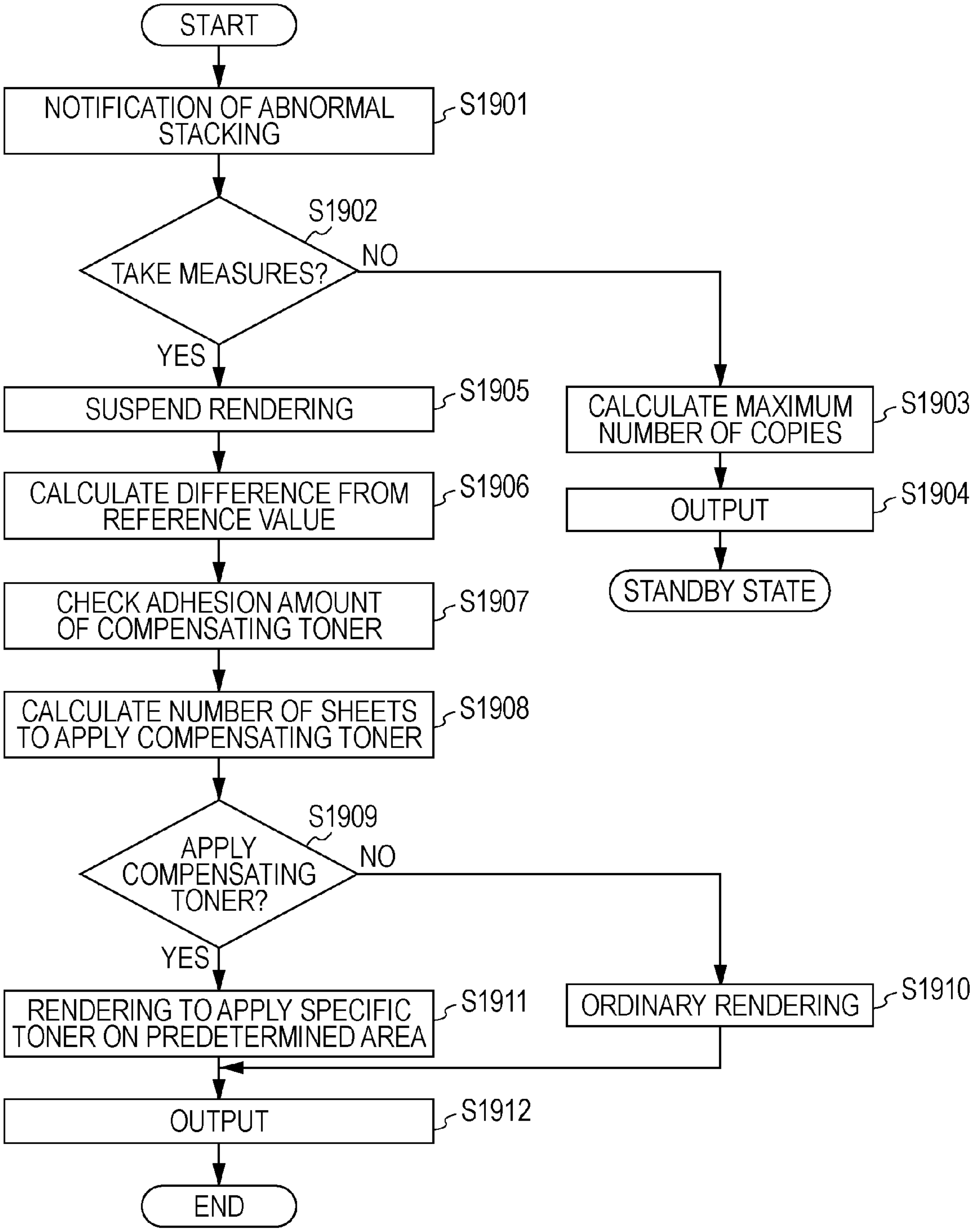
FIG. 20 is a flowchart illustrating an example of a seventh data processing procedure according to a third embodiment.

Regarding the configuration of the printing apparatus 1000 and the process performed in the printing apparatus 1000, the part same as that in the first and second embodiments is not described here. In the first and second embodiments, the CPU 1 performs the process illustrated in the flowchart in FIG. 15 in step S605. In the third embodiment, the CPU 1 performs the process illustrated in the flowchart in FIG. 20 in step S605. FIG. 20 is a flowchart illustrating an example of a seventh data processing procedure in the host apparatus 1600. The respective steps in the flowchart in FIG. 20 are performed in step S605 and are realized when the CPU 1 loads the output stacking control program to the RAM 2 and executes the program.

If it is estimated in the abnormal stacking estimating step that abnormal stacking occurs, the CPU 1 allows the CRT 9 in the host apparatus 1600 as an output source to display a message indicating that abnormal stacking will occur in step S1901.

In step S1902, the CPU 1 determines whether setting to take measures is set in the output stacking estimation setting in step S601.

If the CPU 1 determines that setting to take measures is not made, the process proceeds to step S1903. In step S1903, the CPU 1 calculates an allowable number of copies allowing inclination to be within an allowable range. Specifically, the CPU 1 calculates the number of copies allowing the difference between first and second areas on a sheet to exceed the inclination reference value.

In step S1904, the CPU 1 outputs sheets to the stacking unit. At this time, the CPU 1 counts the number of copies of output sheets. When the CPU 1 determines that the number of output copies has reached the number calculated in the inclination estimating step, the CPU 1 stops output by the printing apparatus 1000 and a standby state occurs.

On the other hand, if the CPU 1 determines in step S1902 that setting to suppress inclination is made in step S601, the process proceeds to step S1905.

In step S1905, the CPU 1 suspends an output process including a rendering process for output to the printing apparatus 1000. Then, in step S1906, the CPU 1 calculates the difference between the difference value calculated in the inclination estimating step and the inclination reference value.

In step S1907, the CPU 1 checks the maximum amount of specific toner (compensating toner to compensate inclination of sheets) that can be applied in a specific area of a sheet. Here, the CPU 1 checks the maximum amount on the basis of the information stored in the memory such as the ROM 3.

Here, the specific toner is a clear toner. The CPU 1 checks the adhesion amount of toner in a case where the toner is applied on a predetermined position and area in accordance with the position of inclination. Alternatively, a C, M, Y, or K toner or a CMYK-mixed toner may be used as the specific toner by setting made by the user.

In step S1908, the CPU 1 calculates the number of sheets on which the compensating toner is to be applied. In this calculation, the CPU 1 divides the difference calculated in step S1906 between the difference value calculated in the inclination estimating step and the inclination reference value by the adhesion amount of specific toner to be applied on the sheets.

In step S1909, the CPU 1 determines whether there is the necessity to apply the compensating toner on the sheets. If the CPU 1 determines that there is the necessity to apply the compensating toner, the process proceeds to step S1911. On the other hand, if the CPU 1 determines that there is no necessity to apply the compensating toner, the process proceeds to step S1910.

Figure 21A:
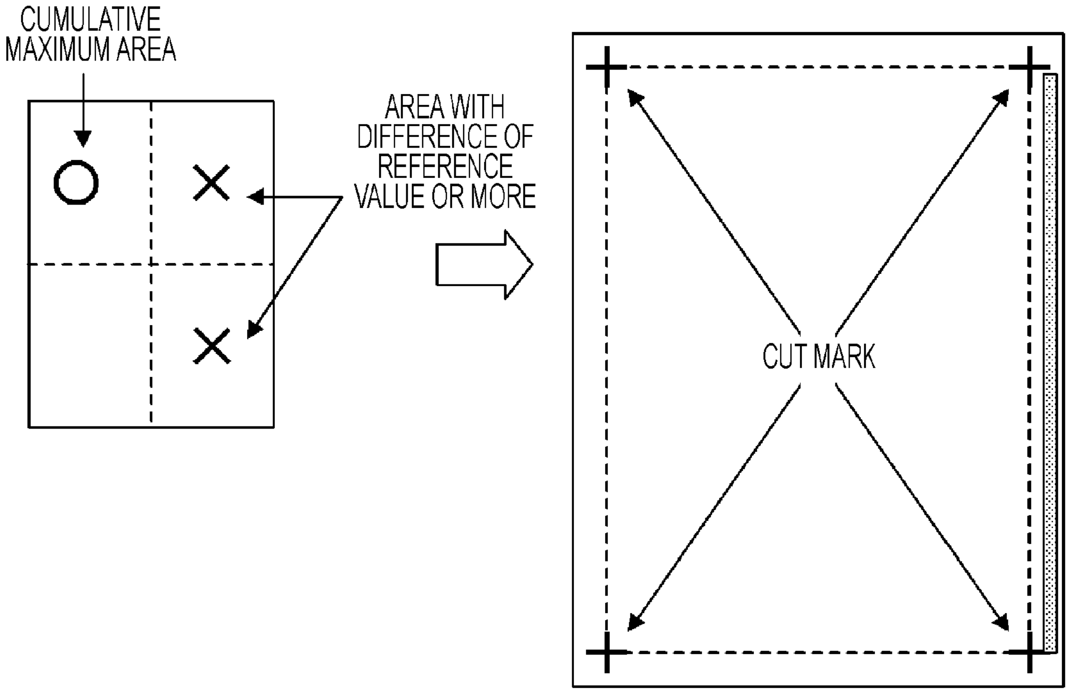
FIGS. 21A and 21B illustrate a compensating toner area output to compensate inclination according to the third embodiment.
Figure 21B:
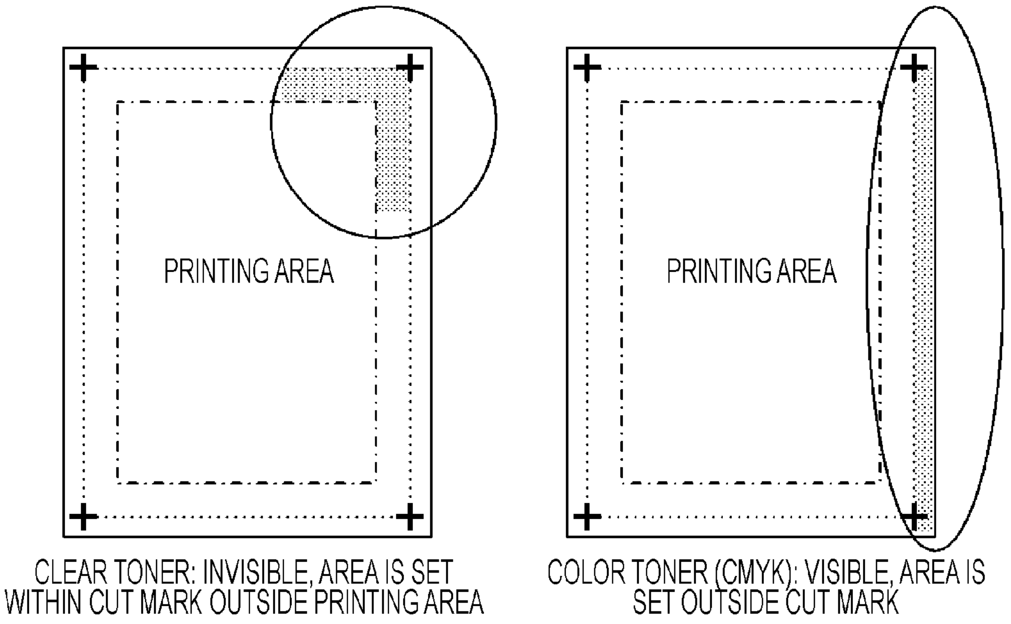

In step S1911, the CPU 1 performs a rendering process of applying the specific toner in a predetermined area with respect to an inclined place, as illustrated in FIG. 21B. The predetermined area is the vicinity of a cut mark, as illustrated in FIG. 21B. Also, the CPU 1 applies the specific toner in the direction of sheets determined to incline in step S1306 in FIG. 13, so as to suppress inclination of the sheets.

In FIG. 21B, the cut mark indicates a reference position that is cut by a cutter or the like on the basis of cross marks at four corners. That is, the sheets are cut by a cutter or the like on the basis of the cross marks at the four corners.

Therefore, in a case where the compensating toner is applied outside the printing area (cut mark), a color toner (YMCK) is used as the compensating toner. In a case where the compensating toner is applied inside the printing area, a clear toner is used as the compensating toner to minimize an influence on the printout.

In step S1912, the CPU 1 outputs the print data generated in the rendering in step S1910 or S1911 to the printing apparatus 1000, and the process ends.

By performing control in the above-described manner, inclination of sheets due to unevenness of toner on the sheets can be reduced. Accordingly, the number of sheets that can be stacked can be increased while maintaining stability of the stacked sheets.

In the above-described embodiments, descriptions have been given about processes of compensating inclination of a bundle of output sheets due to unevenness of toner in the host apparatus 1600. Alternatively, the above-described processes may be performed in the printing apparatus 1000.

That is, when the above-described processes are performed by the CPU of the control unit in the printing apparatus 1000 instead of the CPU 1 in the host apparatus 1600, unpiling of an equivalent output bundle can be compensated. The respective steps performed by the CPU in the printing apparatus 1000 correspond to those in the flowchart in the above-described embodiments, and thus the description thereof is omitted.

Fourth Embodiment

Hereinafter, descriptions are given about a configuration of data processing programs that can be read by the information processing apparatus or image forming apparatus according to an embodiment of the present invention with reference to the memory map illustrated in FIG. 22.

FIG. 22 illustrates a memory map of a storage medium to store various data processing programs that can be read by the information processing apparatus or the image forming apparatus according to the embodiment of the present invention.

Although not illustrated in the figure, information to manage the program group stored in the storage medium, e.g., version information and an author, may be stored. Also, information depending on an OS on a program reading side, e.g., icons to identify programs, may be stored.

Furthermore, data depending on the various programs is managed in the directory. Also, a program to install the various programs to a computer may be stored. Also, a decompressing program may be stored in a case where an installed program is compressed.

The functions illustrated in FIGS. 6, 8, 10, 13, 15, 18, and 20 according to the embodiments may be carried out by a host computer in accordance with programs installed from the outside. In that case, an information group including the programs may be supplied to an output apparatus from a storage medium, such as a CD-ROM, a flash memory, or an FD, or from an external storage medium via a network.

As described above, the storage medium storing software program codes to realize the functions of the above-described embodiments may be supplied to a system or an apparatus. Then, a computer (or CPU or MPU) of the system or the apparatus may read and execute the program codes stored in the storage medium. Accordingly, the embodiments of the present invention are carried out.

In this case, the program codes themselves read from the storage medium realize a new function of the present invention, and thus the storage medium storing the program codes constitutes the present invention.

The present invention is not limited to the above-described embodiments, and various modifications (including an organic combination of the respective embodiments) based on the spirit of the present invention are not excluded from the scope of the present invention.

According to the embodiments of the present invention, unpiling or large inclination of a bundle caused by uneven printing can be estimated before large-amount output to a stacking unit, such as a tray or a stacker, by calculating a cumulative value of an adhesion amount of toner. Also, a user can freely select an estimating method, e.g., a method for accurately measuring inclination or a high-speed estimating method, in accordance with a dividing method of pages. Furthermore, since the degree of inclination is also estimated, appropriate measures can be taken for the inclination.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A printing apparatus comprising:
a printing unit configured to print an image on a sheet in accordance with image data;
a stacking unit configured to stack, on a stacker, a sheet on which an image is printed by the printing unit; and
a control unit configured to change, after the printing unit prints images on a first number of a first type of sheets, an orientation of the image to be printed in accordance with the image data, and to change, after the printing unit prints images on a second number of a second type of sheets which is heavier than the first type of sheets, an orientation of the image to be printed in accordance with the image data, the second number being larger than the first number.

2. A printing apparatus according to claim 1,
wherein the control unit changes, each time the printing unit prints images on the first number of the first type of sheets, the orientation of the image to be printed in accordance with the image data.

3. A printing apparatus according to claim 1,
wherein the first number of sheets corresponds to a plurality of copies of sheets, and the second number of sheets corresponds to a plurality of copies of sheets.

4. A printing apparatus according to claim 1,
wherein the control unit rotates, after the printing unit prints images on the first number of the first type of sheets, the orientation of the image to be printed in accordance with the image data.

5. A printing apparatus according to claim 4,
wherein the control unit rotates the orientation of the image to be printed by 180 degrees.

6. A control method for controlling a printing apparatus, comprising:
printing an image on a sheet in accordance with image data;
stacking, on a stacking unit, a sheet on which an image is printed; and
changing, after images are printed on a first number of a first type of sheets, an orientation of the image to be printed in accordance with the image data, and changing, after images are printed on a second number of a second type of sheets which is heavier than the first type of sheets, an orientation of the image to be printed in accordance with the image data, the second number being larger than the first number.

7. A non-transitory computer readable storage medium for storing a computer program for controlling a printing apparatus, the computer program comprising:
a code to print an image on a sheet in accordance with image data;
a code to stack, on a stacker, a sheet on which an image is printed; and
a code to change, after images are printed on a first number of a first type of sheets, an orientation of the image to be printed in accordance with the image data, and to change, after images are printed on a second number of a second type of sheets which is heavier than the first type of sheets, an orientation of the image to be printed in accordance with the image data, the second number being larger than the first number.

8. A printing apparatus comprising:
a printing unit configured to print an image on a sheet in accordance with image data;
a stacking unit configured to stack, on a stacker, a sheet on which an image is printed by the printing unit; and
a control unit configured to change, after the printing unit prints images on a first number of a first type of sheets, an orientation of the image to be printed in accordance with the image data, and to change, after the printing unit prints images on a second number of a second type of sheets which is thicker than the first type of sheets, an orientation of the image to be printed in accordance with the image data, the second number being larger than the first number.

* * * * *